(12) United States Patent
McPhee et al.

(10) Patent No.: US 10,887,808 B1
(45) Date of Patent: Jan. 5, 2021

(54) OPTIMIZING COMMUNICATIONS ACROSS MULTIPLE NETWORK INTERFACES OF A CONNECTED VEHICLE

(71) Applicant: Cisco Technology, Inc., San Jose, CA (US)

(72) Inventors: Andrew Michael McPhee, San Jose, CA (US); Kevin William Holcomb, Apex, NC (US); Yaron Sella, Beit Nekofa (IL); Joel Abraham Obstfeld, Herts (GB)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/739,861

(22) Filed: Jan. 10, 2020

(51) Int. Cl.
*H04W 36/14* (2009.01)
*H04W 4/40* (2018.01)
(Continued)

(52) U.S. Cl.
CPC ............ *H04W 36/14* (2013.01); *G06N 20/00* (2019.01); *H04B 7/02* (2013.01); *H04B 7/022* (2013.01); *H04B 7/0404* (2013.01); *H04B 7/0408* (2013.01); *H04B 7/0413* (2013.01); *H04B 7/0491* (2013.01); *H04B 7/0619* (2013.01); *H04B 7/0621* (2013.01); *H04B 7/0697* (2013.01); *H04B 7/08* (2013.01);
(Continued)

(58) Field of Classification Search
CPC ..... H04W 4/40; H04W 84/005; H04W 36/34; H04W 4/48; H04W 36/0016; H04W 36/03; H04W 48/06; H04W 48/20; H04W 4/46; H04W 84/042; H04W 36/14; H04W 36/32; H04W 36/30; H04W 76/14; H04W 4/027; H04W 4/80; H04W 4/029; H04W 4/70; H04W 40/20; H04W 4/025; H04B 17/318; H04B 7/18528; H04B 7/0617; G06N 20/00

See application file for complete search history.

(56) References Cited

U.S. PATENT DOCUMENTS

| | | |
|---|---|---|
| 8,213,388 B2 | 7/2012 | Pathan et al. |
| 10,320,923 B2 | 6/2019 | Moghe et al. |

(Continued)

OTHER PUBLICATIONS

U.S. Appl. No. 16/575,672, filed Sep. 19, 2019, Barton et al.

*Primary Examiner* — Fred A Casca
(74) *Attorney, Agent, or Firm* — Behmke Innovation Group LLC; Kenneth J. Heywood; Jonathon P. Western

(57) ABSTRACT

In one embodiment, a vehicle having a plurality of network interfaces communicates with a first communication network via a first one of the network interfaces. The vehicle receives performance data regarding the first communication network and one or more other communication network, wherein the received performance data is associated with a particular location. The vehicle determines in advance of arriving at the particular location that the vehicle should switch from communicating with the first communication network to communicating with a selected one of the one or more other communication network, based on the received performance data. At the particular location, the vehicle switches from communicating with the first communication network via the first network interface to communicating with the selected communication network via a second one of the plurality of network interfaces.

18 Claims, 8 Drawing Sheets

(51) Int. Cl.

| | |
|---|---|
| *G06N 20/00* | (2019.01) |
| *H04W 36/30* | (2009.01) |
| *H04W 36/32* | (2009.01) |
| *H04W 4/70* | (2018.01) |
| *H04W 40/20* | (2009.01) |
| *H04W 4/02* | (2018.01) |
| *H04W 4/46* | (2018.01) |
| *H04W 76/14* | (2018.01) |
| *H04W 4/029* | (2018.01) |
| *H04W 16/28* | (2009.01) |
| *H04W 24/10* | (2009.01) |
| *H04W 76/27* | (2018.01) |
| *H04W 36/08* | (2009.01) |
| *H04L 1/20* | (2006.01) |
| *H04B 7/022* | (2017.01) |
| *H04B 7/02* | (2018.01) |
| *H04B 7/0404* | (2017.01) |
| *H04B 7/0413* | (2017.01) |
| *H04B 7/0408* | (2017.01) |
| *H04B 7/0491* | (2017.01) |
| *H04B 7/08* | (2006.01) |
| *H04B 7/22* | (2006.01) |
| *H04B 7/06* | (2006.01) |
| *H04B 7/10* | (2017.01) |
| *H04B 7/12* | (2006.01) |
| *H04W 16/32* | (2009.01) |
| *H04W 16/18* | (2009.01) |
| *H04W 16/22* | (2009.01) |
| *H04W 16/26* | (2009.01) |
| *H04W 16/14* | (2009.01) |
| *H04W 16/24* | (2009.01) |
| *H04W 36/00* | (2009.01) |
| *H04L 5/00* | (2006.01) |
| *H04L 1/06* | (2006.01) |

(52) U.S. Cl.
CPC ............... *H04B 7/10* (2013.01); *H04B 7/12* (2013.01); *H04B 7/22* (2013.01); *H04L 1/20* (2013.01); *H04W 4/025* (2013.01); *H04W 4/029* (2018.02); *H04W 4/40* (2018.02); *H04W 4/46* (2018.02); *H04W 4/70* (2018.02); *H04W 16/14* (2013.01); *H04W 16/18* (2013.01); *H04W 16/22* (2013.01); *H04W 16/24* (2013.01); *H04W 16/26* (2013.01); *H04W 16/28* (2013.01); *H04W 16/32* (2013.01); *H04W 24/10* (2013.01); *H04W 36/00* (2013.01); *H04W 36/08* (2013.01); *H04W 36/30* (2013.01); *H04W 36/32* (2013.01); *H04W 40/20* (2013.01); *H04W 76/14* (2018.02); *H04W 76/27* (2018.02); *H04L 1/06* (2013.01); *H04L 5/003* (2013.01); *H04L 5/0007* (2013.01)

(56) References Cited

U.S. PATENT DOCUMENTS

| | | | |
|---|---|---|---|
| 2012/0182935 A1 | 7/2012 | Addepalli et al. | |
| 2013/0029708 A1* | 1/2013 | Fox | H04W 24/02 |
| | | | 455/509 |
| 2014/0126348 A1 | 5/2014 | Mahamuni et al. | |
| 2015/0189556 A1* | 7/2015 | Sidhu | H04W 40/26 |
| | | | 455/436 |
| 2018/0234901 A1* | 8/2018 | Suh | H04W 36/08 |
| 2019/0313317 A1* | 10/2019 | Murphy | H04W 36/0083 |
| 2020/0037392 A1* | 1/2020 | Qui | H04W 48/16 |

* cited by examiner

OPTIMIZING COMMUNICATIONS ACROSS MULTIPLE NETWORK INTERFACES OF A CONNECTED VEHICLE

TECHNICAL FIELD

The present disclosure relates generally to computer networks, and, more particularly, optimizing communications across multiple network interfaces of a connected vehicle.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

Connected vehicles have become increasingly ubiquitous in the automotive industry, meaning that many vehicles now provide the ability to connect to a network while moving. For example, some vehicles are now equipped with cellular transceivers, thereby allowing a vehicle to communicate via a cellular network. This is done, for example, for purposes of gathering telemetry data regarding the vehicle, supporting navigation applications on the vehicle, sending media content to the vehicle, and the like.

While most connected vehicles today include a single network interface, a subset of these vehicles are now equipped with multiple interfaces, such as in the case of emergency response vehicles. That way, if the vehicle loses connectivity with one network, it can attempt to communicate via another network. Although this approach helps to minimize the amount of time the vehicle is disconnected, it is reactive in nature and still requires the failure of the first connection before switching over to the backup connection.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
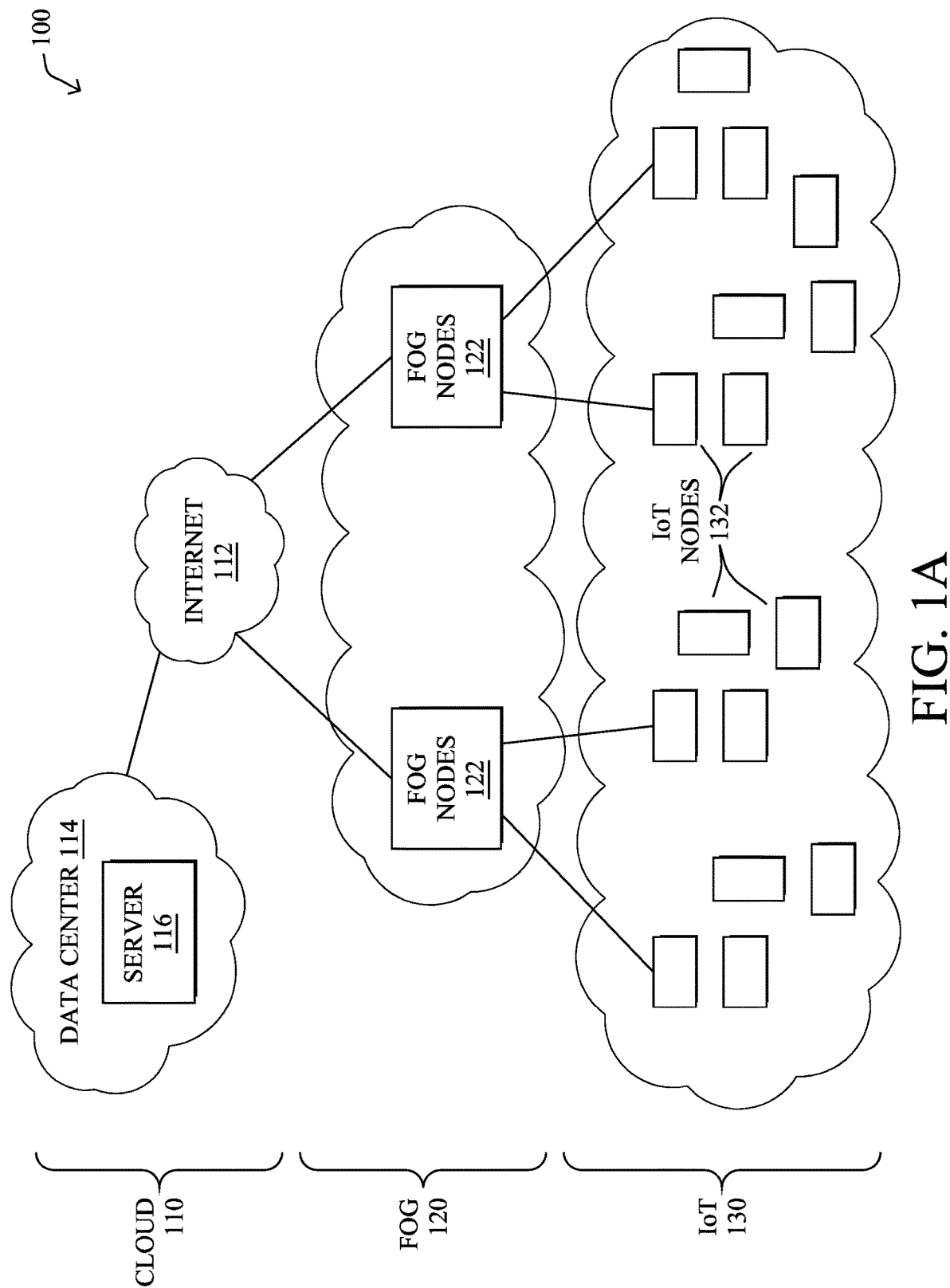
FIGS. 1A-1B illustrate an example communication network.

According to one or more embodiments of the disclosure, a vehicle having a plurality of network interfaces communicates with a first communication network via a first one of the network interfaces. The vehicle receives performance data regarding the first communication network and one or more other communication networks, wherein the received performance data is associated with a particular location. The vehicle, in advance of arriving at the particular location, determines that the vehicle should switch from communicating with the first communication network to communicating with a selected one of the one or more other communication network, based on the received performance data. The vehicle, at the particular location, then switches from communicating with the first communication network via the first network interface to communicating with the selected communication network via a second one of the plurality of network interfaces.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
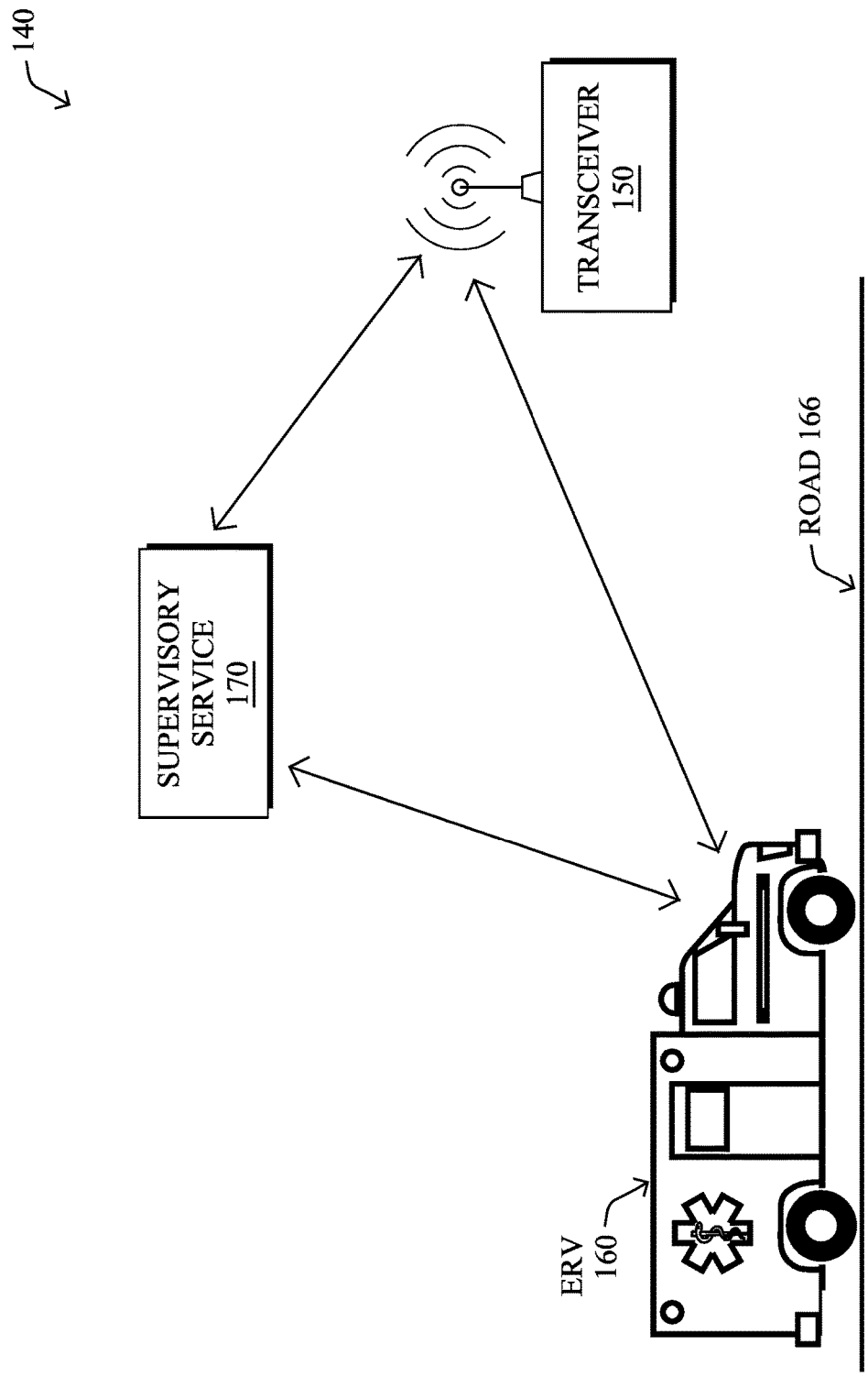

FIG. 1B illustrates an example vehicle communication system 140, according to various embodiments. In particular, vehicle communication system 140 may include any or all of the following components: emergency rescue vehicle (ERV) 160, a transceiver 150, and/or a remote supervisory service 170. Generally, ERV 160 may be any form of emergency rescue vehicle configured to move from one physical location to another such as, but not limited to, cars, buses, trucks, boats, trains, aerial vehicles, and the like. In many cases, ERV 160 may be configured to transport people and/or cargo. Further, ERV 160 may be an autonomous vehicle, semi-autonomous vehicle, or manually-operated vehicle, according to the various embodiments herein. In some embodiments, ERV 160 is equipped with a high connectivity router. (Note that an ERV is shown as a primary example as many ERVs are equipped with multiple radio transceivers (e.g., multiple cellular radios), but any type of vehicle that is so equipped may use the techniques herein, and an ERV is not meant to be limiting to the type of vehicles of the embodiments herein.)

In some embodiments, vehicle communication system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, transceiver 150 comprise a fog node 122 at fog computing layer 120, while ERV 160 may be viewed as an IoT node 132 at IoT layer 130. Thus, ERV 160 may communicate directly with transceiver 150, and/or via other IoT nodes 132 (e.g., other vehicles, etc.), and transceiver 150 may provide some degree of processing over the communicated data.

In general, transceiver 150 is configured to communicate with ERV 160, to provide WAN network access to ERV 160. For example, transceiver 150 may take the form of a communications tower, a Wi-Fi access point, a road side unit (RSU), or any other form of communication device configured to communicate with ERV 160. While the communications between ERV 160 will typically take the form of wireless communications, further embodiments also provide for transceiver 150 to communicate with ERV 160 via a hardwired connection. For example, transceiver 150 may be connected via wiring with ERV 160 during fueling or recharging, etc.

Transceiver 150 may communicate with supervisory service 170 via a WAN, such as the Internet 112 or another WAN, such as a Multiprotocol Label Switching (MPLS) network, or a software-defined (SD)-WAN. For example, transceiver 150 may communicate with supervisory service 170 by leveraging a hardwired network connection, communications or other wireless connection, satellite connection, or the like.

As would be appreciated, ERV 160 may comprise its own local network, to allow the various components of ERV 160 to communicate with one another. For example, ERV 160 may comprise any number of sub-networks, such as a Controller Area Network (CAN) bus, an IP network, etc., to allow the various systems of ERV 160 to communicate with one another. Such system may include, but are not limited to, an engine control unit (ECU), a battery management system (BMS) that manages the local battery of ERV 160, an advanced driver assistance system (ADAS) system, and the like. A local gateway of ERV 160 may provide communicative connectivity between the local network of ERV 160 and other devices. For example, the local gateway of ERV 160 may provide wireless connectivity to transceiver 150 located near road 166 on which ERV 160 is traveling.

Figure 2:
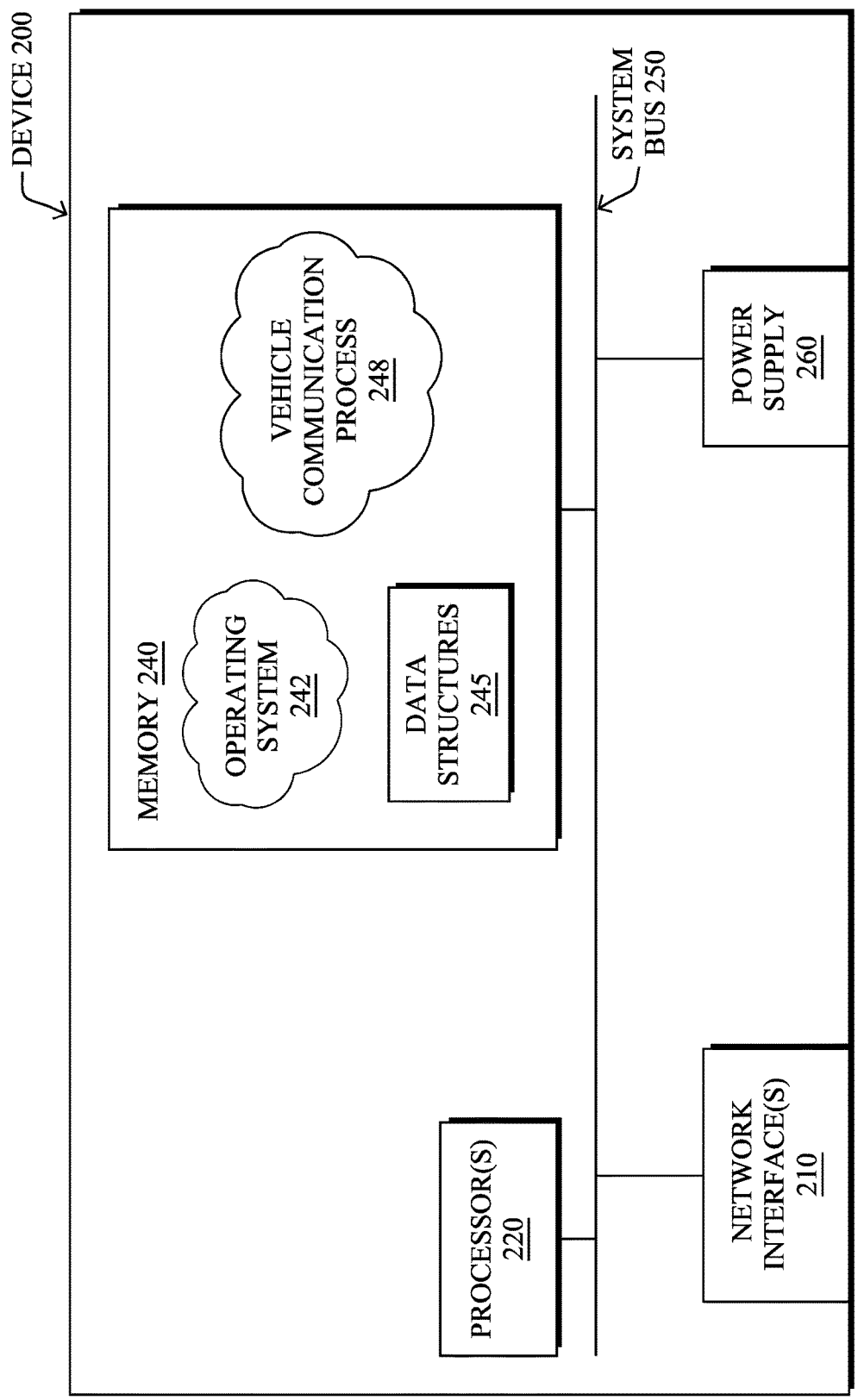
FIG. 2 illustrates an example network device/node.

FIG. 2 is a schematic block diagram of an example computing device/node 200 that may be used with one or more embodiments described herein e.g., as any of the devices shown in FIGS. 1A-1B above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interface(s) 210 may be configured to transmit and/or receive data using a variety of different communication protocols. Note, further, that the nodes may have two or more different types of network connections, e.g., wireless and wired/physical connections, and that the view herein is merely for illustration. Also, while the network interface(s) 210 is shown separately from power supply 260, for fog modules using PLC, the network interface(s) 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interface(s) 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative vehicle communication process 248, as described herein.

In some embodiments, vehicle communication process 248 may employ any number of machine learning techniques, to optimize the communications of the ERV on which device 200 is located. In general, machine learning is concerned with the design and the development of techniques that receive empirical data as input (e.g., data regarding multiple communication networks) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M = a*x + b*y + c$ and the cost function is a function of the number of misclassified points. The learning process then operates by adjusting the parameters a,b,c such that the number of misclassified points is minimal. After this optimization/learning phase, vehicle communication process 248 can use the model M to classify new data points, so as to select the optimum communication network with which a vehicle should communicate. Often, M is a statistical model, and the cost function is inversely proportional to the likelihood of M, given the input data.

In various embodiments, vehicle communication process 248 may employ one or more supervised, unsupervised, or semi-supervised machine learning models. Generally, supervised learning entails the use of a training set of data, as noted above, that is used to train the model to apply labels to the input data. For example, the training data may include data for signals that have been labeled as "strong coverage" or "weak coverage" regarding the communication networks. On the other end of the spectrum are unsupervised techniques that do not require a training set of labels. Notably, while a supervised learning model may look for previously seen patterns that have been labeled as such, an unsupervised model may instead look to whether there are sudden changes in the behaviors of the network(s). Semi-supervised learning models take a middle ground approach that uses a greatly reduced set of labeled training data.

Example machine learning techniques that vehicle communication process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, convolutional neural networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model caused a vehicle to switch to another, non-optimum network. Conversely, the false negatives of the model may refer to the number of times the model incorrectly deemed the current network in use by a vehicle as the optimum network. True negatives and positives may refer to the number of times the model correctly classified the current network in use by a vehicle, or another network, as the optimum network for the vehicle. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, some vehicles, such as emergency response vehicles (ERVs), now include multiple network interfaces (e.g., interfaces 210) to allow the vehicle to communicate with multiple communication networks. This configuration may be used for redundancy (e.g., improving the vehicle's ability to cope with reduced service coverage from any one communications provider), or else where one radio system (e.g., cellular radio) may be used for a vehicle manufacturer to communicate with the vehicle (e.g., gathering telemetry relating to the vehicle's performance and operational state), while another radio system (e.g., cellular) may be used to providing 'infotainment' services such as streamed audio or navigation services.

Figure 3:
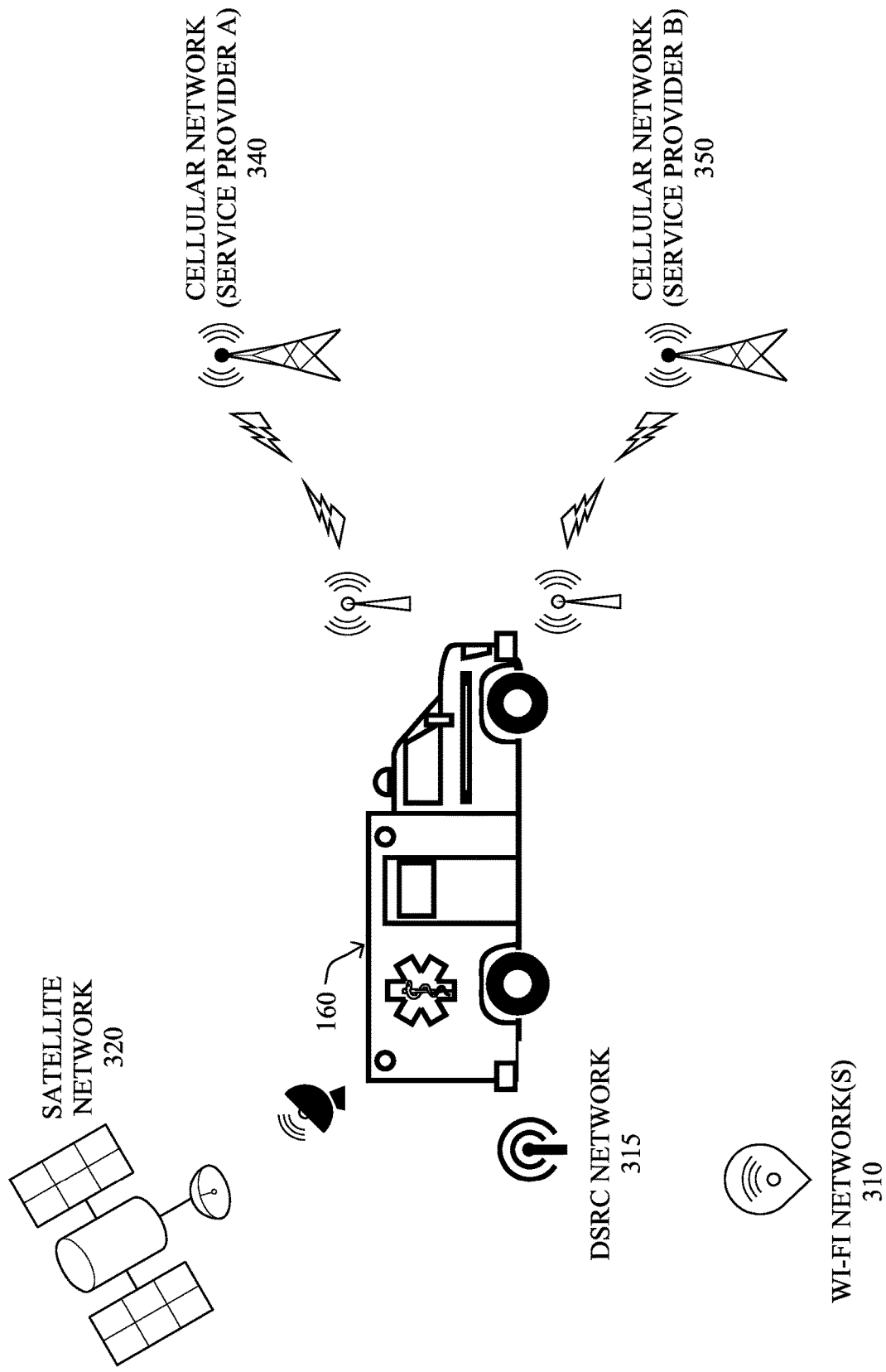
FIG. 3 illustrates an example emergency response vehicle having multiple network interface technologies.

As an example, FIG. 3 illustrates ERV 160 with multiple network interfaces that allow ERV 160 to communicate with multiple communication networks. Such networks may include any or all of the following:

One or more Wi-Fi networks 310: For example, ERV 160 may include one or more interfaces to access Wi-Fi hotspots, a Wi-Fi access point, roadside infrastructure devices, etc.

DSRC (dedicated short-range communications) network 315: For example, ERV 160 may include one or more interfaces to use DSRC, which is a form of near field communication (e.g., one-way or two-way short-range to medium-range wireless communication channels), to establish communication with other connected vehicles as a single hop or multi-hop vehicle-to-vehicle network.

Satellite network 320: For example, ERV 160 may include one or more interfaces to access satellite network(s) 320. ERV 160 may also access satellite network 320 to receive data related to its location using global positioning functionality.

Cellular network 340 (service provider A): For example, ERV 160 may include one or more interfaces to access a first cellular network 340 (3G, 4G, 5G, WiMAX/LTE, EVDO, etc.) via a cellular link.

Cellular network 350 (service provider B): For example, ERV 160 may include one or more interfaces to access a second cellular network 350 (3G, 4G, 5G, WiMAX/LTE, EVDO, etc.) via a cellular link.

In other words, the multiple network interfaces of ERV 160 may facilitate communication via the various networks (including both internal and external) available to ERV 160 at any given location. The network interfaces may include multiple wireless interfaces (e.g., Wi-Fi, DSRC, etc.) and may be operated by different providers (e.g., AT&T, Sprint, Verizon, etc.). Other network interfaces of ERV 160 may include physical ports (e.g., Ethernet, USB, HDMI, etc.), interfaces for wired or wireless internal subsystems, etc.

Conventionally, as a vehicle with multiple network interfaces navigates along its route, its interfaces operate to ensure that the vehicle remains connected to at least one network at all times. In other words, the multiple interfaces provide a fail-safe or back-up connection, in case the vehicle loses its connectivity with its current communication network.

Figure 4:
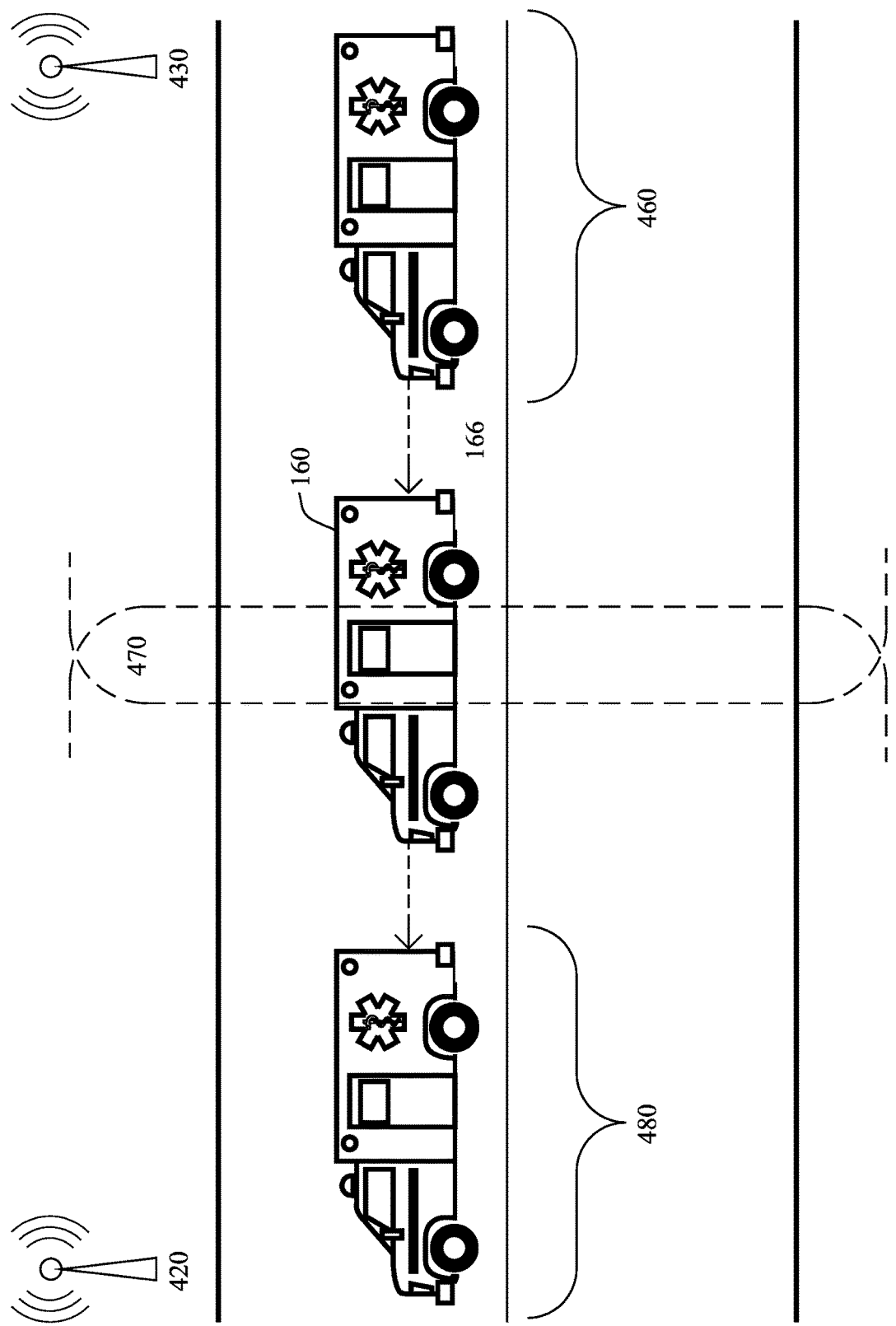
FIG. 4 illustrates an example emergency response vehicle navigating between communication networks.

For example, as shown in FIG. 4, assume that ERV 160 is connected to communication network 430 at location 460 and navigates along roadway 166 to location 470. Under a traditional approach, ERV 160 will continue to communicate via network 430 until it travels out of range of network 430 and loses connectivity, such as when it reaches location 480. When this occurs, ERV 160 will then connect to network 420 via its other network interface. This means, however, that ERV 160 will first lose all network connectivity before switching to the new, backup network 420. As a result, all communications sent by ERV 160 will also be lost and will need to be resent via network 420, once ERV 160 establishes a connection.

Beyond the potential for data loss after losing network connectivity, traditional vehicles with multiple network interfaces are also not optimized to take advantage of the different networks available to the vehicle at any given time. For example, when ERV 160 is located at location 470, it is within communication range of both communication networks 420 and 430, but will not switch networks until it first loses connectivity to network 430.

By way of example, assume now that network 420 offers better performance than that of network 430. This means that when ERV 160 is located at location 470, it is actually communicating in a non-optimal way, by continuing to use the network with lower performance. Doing so can potentially lead to communication errors, which are particularly troublesome in the case of emergency vehicles.

Optimizing Multi-Network Communications of Connected Vehicle

As noted above, given the variety of communications options that a vehicle may have, one challenge is to be able to make intelligent decisions about which communications medium to use as the vehicle moves through a particular geography where the communications coverage and quality from any one communications service provider may vary. This is particularly true for both high priority communications that require consistent operation, as well as for selecting a communications medium for specific data transfer for particular applications in the vehicle (e.g., telemetry versus streaming infotainment, etc.).

The techniques herein introduce a process for optimizing communications across multiple network interfaces of a connected vehicle. In some aspects, the optimization process described herein controls when a connected vehicle switches from one communication network to another. The timing of such a network switchover may be critical for emergency response functions, such as for video transmission(s) during a traffic stop, audio transmission(s) during a high speed chase, etc. In further aspects, the optimization process provides for a vehicle to switch networks before any disconnection, decreased signal, etc. occurs with the "old" network.

Illustratively, the techniques described herein may be performed by hardware, software, and/or firmware, such as in accordance with the vehicle communication process 248, which may include computer executable instructions executed by the processor 220 (or independent processor of interfaces 210) to perform functions relating to the techniques described herein, e.g., in conjunction with routing process 244.

Specifically, according to one or more embodiments of the disclosure as described in detail below, a vehicle having a plurality of network interfaces communicates with a first communication network via a first one of the network interfaces. The vehicle may receive performance data regarding the first communication network and one or more other communication networks, wherein the received performance data is associated with a particular location. The vehicle, in advance of arriving at the particular location, may determine that the vehicle should switch from communicating with the first communication network to communicating with a selected one of the one or more other communication networks, based on the received performance data. The vehicle, at the particular location may then switch from communicating with the first communication network via the first network interface to communicating with the selected communication network via a second one of the plurality of network interfaces.

Operationally, to better illustrate the techniques herein, consider again the case shown in FIG. 4 in which ERV 160 navigates a certain road section 166, accessing communication network 430. ERV 160 may be host to various applications (e.g., multimedia, collaboration, social, transportation, enterprise, navigation, communication, etc.) on its own interface(s) or on devices (e.g., mobile, walkie-talkie, etc.) within the ERV 160.

As ERV 160 enters a particular location 470, it may be optimal for the ERV 160 to switchover to communication network 420. This could be for a variety of reasons, such as, but not limited to, a weakened signal, a dropped signal, etc. from communication network 430. At the particular location 470, all of the applications running in ERV 160 may experience delays or stop communicating altogether based on the connectivity with communication network 430.

By leveraging known information about location 470 and the optimization techniques herein, ERV 160 may initiate a network switchover as it enters location 470, so that ERV 160 accesses communication network 420 to avoid any issues with coverage or signal quality with respect to network 430. After ERV 160 performs the network switchover, ERV 160 may also capture data related to the network switchover, including the time of day and location of the ERV 160 when it performed the switchover, detection of any delay in the switchover, quality of the switchover, data transfer rate, etc. In turn, ERV 160 can report this information to a supervisory service (e.g., service 170), to assist other vehicles to select an optimum network at location 470, as well.

Figure 5:
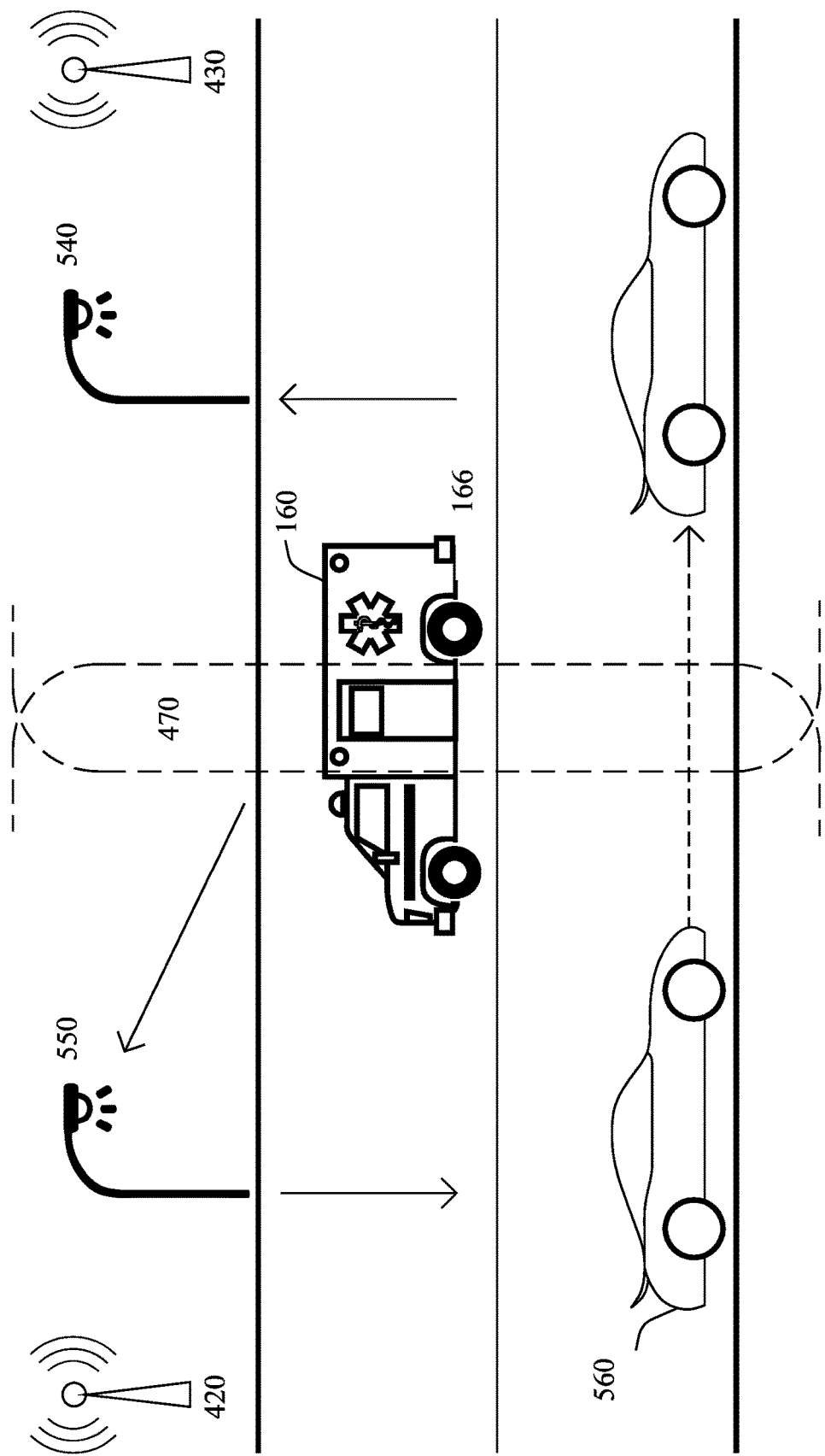
FIG. 5 illustrates an example emergency response vehicle and another vehicle navigating between two communication networks.

In various embodiments, the network performance data that a vehicle can use to select an optimum communication network at any given location can be shared via a centralized, supervisory service or, alternatively, in a peer-to-peer manner with other vehicles. For example, ERV 160 may base its switchover decision on information provided by other vehicles in the area and pass information about its own switchover on for use by other vehicles, as well. By way of example of the interaction of multiple vehicles with respect to network selection, FIG. 5 illustrates an example of emergency response vehicle (ERV) 160 and another vehicle 560 navigating between two communication networks 420-430. As shown in FIG. 5, also assume that several road side units (RSUs) 540, 550 are deployed in the vicinity of roadway 166. Each of the RSUs 540, 550 may be in communication with a cloud server (e.g., supervisory service 170) and/or an external sensor/information provider. In this example, the external sensor/information provider may include ERV 160 and/or connected vehicle 560, and captures performance data regarding the various networks available to that vehicle and/or its switchover from network 430 to 420. In one embodiment, ERV 160 and connected vehicle 560 may be equipped with DSRC or other wireless-capable On-Board-Units (OBUs) to communicate between each other and/or with RSUs 540, 550. In other words, network performance data may be shared either directly between vehicles, shared by leveraging RSUs near the location associated with the performance data, or via a service located in the cloud or a datacenter.

For example, as ERV 160 travels within a predetermined range of RSU 550, ERV 160 may establish a communication link with RSU 550. RSU 550 may receive data, from ERV 160, related to the network switchover that had occurred at the particular location 470. The data may include the quality of the network switchover (e.g., excellent, good, medium, poor, very poor, etc.), the performance data for each of networks 420-430 at location 470, etc. The data may further include the exact location, the exact time, etc. at which ERV 160 performed the networks switchover.

In many cases, ERV 160 does not know which other ERVs or other vehicles with multiple network interfaces are present in the area or will become present. Accordingly, ERV 160 may utilize DSRC to pass its collected information on to other vehicles, such as vehicle 560. For example, after performing its network switchover, ERV 160 may send its collected information on to RSU 550 (e.g., the next RSU that it encounters) using DSRC, Wi-Fi, or the like. In turn, RSU 550 then propagates this information to other RSUs in the area, such as RSU 540, and on to any interested vehicle that passes by it. This propagation of the collected information stems from the fact that, by the time an oncoming vehicle sees RSU 550, it is already too late. In one embodiment, RSUs 550 and 540 may be connected as part of a single networking infrastructure. In such cases, RSU 550 may simply pass any information that it receives from ERV 160 on to RSU 540, thereby allowing RSU 540 to provide the information to any other vehicles traveling in the same direction as ERV 160. However, if this is not the case, RSUs 550 and 540 may leverage passing vehicles to share the information between one another in a 'pass the parcel' manner. For example, RSU 550 may send the data that it receives from ERV 160 on to vehicle 560 which, in turn, may pass the information on to RSU 540.

In some embodiments, connected vehicle 560 may also leverage any data from ERV 160 that it receives via RSU 550 to optimize its own network selections. For example, as shown, RSU 550 may send the received data related to the network switchover performed by ERV 160 at location 470 to connected vehicle 560. Based on the received data, connected vehicle 560 may determine that network 430 is the optimum network at location 470 and switch from communicating via network 420 to network 430 at location 470. After the network switchover occurs for connected vehicle 560, then the data related to the network switchover is communicated to RSU 540, which may provide the data to all other connected vehicles traveling along roadway 166.

In some embodiments, the cloud server may receive all data from RSUs 540, 550 and coordinate the data to provide to the connected vehicles, such as ERV 160 and connected vehicle 560. In other embodiments, RSU 540 and RSU 550 may communicate directly with each other to receive data related to the network switchover to minimize bandwidth consumed by the entire network. In other embodiments, the cloud server is not required for communication between RSUs and connected vehicles, leading to faster data transfer for network switchover decisions between the connected vehicles.

Rather than a cloud server or some other mechanism, the connected vehicles themselves may perform the signal-strength measurements related to the network switchover. For example, connected vehicle 560 navigates between RSU 540 and RSU 550 on roadway 166, using communication network 420. Connected vehicle 560 may calculate the quality of its signal using network 420 along the way and report its calculations to RSU 550. RSU 550 uses the data to determine the optimum network switchover point(s) between communication network 420 and communication network 430. RSU 550 can also use pass-the-parcel, as noted above, to provide the data to RSU 540, which can then, in turn, provide the data to ERV 160 to perform the network switchover.

Figure 6:
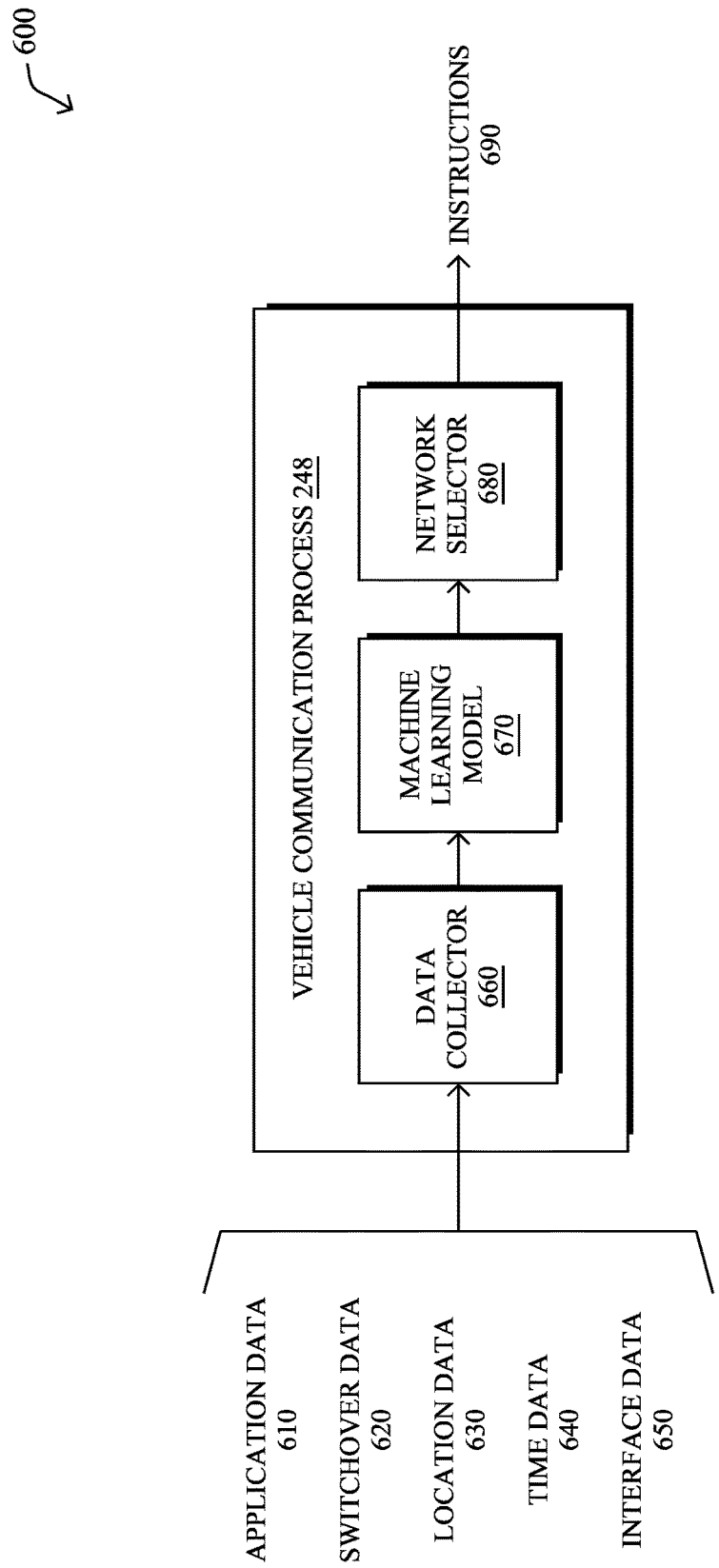
FIG. 6 illustrates an example architecture for optimizing communications across multiple network interfaces of a connected vehicle.

FIG. 6 illustrates an example architecture 600 for optimizing communications across multiple network interfaces of a connected vehicle, according to various embodiments. At the core of architecture 600 may be any or all of the following components: a data collector 660, a machine learning model 670, and/or a network selector 680. These components may be implemented on a single device or, alternatively, in a distributed manner across multiple devices, in which case the executing devices can themselves be viewed as an executing device. For example, parts of architecture 600 may be executed directly on a connected vehicle or, alternatively, executed by a remote device or service in communication therewith. Further, the functionalities of components 660-680 may be combined, omitted, or implemented as part of other processes, in other embodiments.

During execution, data collector 660 may collect various data, such as data 610-650, that can be used by vehicle communication process 248 to select the optimum communication network for a vehicle at any given location. The data 610-650 may come from various sources including, but not limited to, any or all of the following:

Another connected vehicle—For example, if process 248 is executed by a vehicle, then the executing vehicle may receive data 610-650 from one or more other vehicles (e.g., via DSRC, etc.).

An RSU—For example, if the executing vehicle passes an RSU, it may receive data 610-650 left there by another vehicle or relayed to the RSU from another RSU (e.g., via the same infrastructure, via a pass-the-parcel approach, etc.) or a supervisory service in communication therewith.

A supervisory service via the current "best" network in use—In some cases, the executing vehicle may even receive some or all of data 610-650 from a supervisory service (e.g., cloud-based or datacenter-based) via its current network connection.

A vehicle subsystem—For example, vehicle communication process 248 may receive location information from a GPS subsystem of a vehicle, etc.

During execution, data collector 660 may receive application data 610 regarding one or more applications executed by a vehicle or within a vehicle. For example, application data 610 may include the type of application that is running, data indicative of the types of traffic associated with the application (e.g., whether the traffic is of high priority or low priority, etc.), and the like. For instance, assume that an on-board application of an ERV is used to exchange voice and/or video traffic with a hospital while the ERV is en route to the hospital. In such a case, application data 610 may indicate that this application, and its traffic, is of high priority and requires very high network performance (e.g., little to no packet loss, jitter, etc.). In turn, machine learning model 670 can use this information as part of its assessment of the various communication network available to the vehicle. In some embodiments, based on application data 610, the decision can also be made on a per-application basis, such as deciding to only send traffic for a specific application via another network, while keeping the other traffic of the vehicle on its current network.

Data collector 660 may also receive switchover data 620, which generally includes data regarding previous network switchovers performed by other vehicles and/or the current vehicle. For example, switchover data 620 may indicate when and where a network switchover took place and/or the conditions (e.g., network performance data) that led to the switchover. Switchover data 620 may further include information such as data loss, latency, jitter, etc., that may have resulted from the switchovers.

Data collector 660 may further receive location data 630 regarding the location(s) of the vehicle of interest. For example, location data 630 may be generated by an onboard GPS or other location system of the vehicle and indicate the prior, current, and/or expected locations of the vehicle over time. In further cases, location data 630 may also include navigation data, such as the intended route of travel for the vehicle, or the like.

Data collector 660 may also receive time data 640 that is associated with the other data collected by collector 660. For example, time data 640 may be associated with location data 630, allowing data collector 660 to compute the dynamics of the vehicle, such as its velocity, acceleration, predicted future locations, etc.

Data collector 660 may additionally receive interface data 650 regarding the various network interfaces of the vehicle. For example, interface data 650 may include data indicative of which networks can be reached by the vehicle at any given time and/or location, network performance data (e.g., Received Signal Strength Indication (RSSI) data, Signal-to-Noise Ratio (SNR) data, reference signal data, power signal data, quality signal data, bit error rate, etc.) for those networks, and so forth. In some embodiments, interface data 650 may further include information about the various communication networks, such as pricing information (e.g., to optimize the network selection in terms of cost, including costs that change at different times of day), data transfer profiles (e.g., expected data volumes, data rate of decay, data priority/urgency, etc.), signal maps, or the like.

In some embodiments, data collector 660 may apply one or more data filters to data 610-650, so as to ensure that the inputs to machine learning model 670 are the most relevant to assessing the various networks that may be available to a vehicle. Further, data collector 660 may perform other preprocessing tasks, as well, such as computing the distribution of certain data over time, computing statistics (e.g., a mean, average, etc.) from the collected data 610-650, performing dimensionality reductions on the data 610-650, or the like.

According to various embodiments, machine learning model 670 may analyze the data from data collector 660 to predict the optimum network parameters for the vehicle at any given time and/or location. For example, machine learning model 670 may assess the needs of the application(s) on board the vehicle, the location(s) of the vehicle, the performance data for the networks available to the vehicle at any given time and/or location, etc., to predict which of those networks would be optimal for use by the vehicle. For instance, machine learning model 670 may determine that the vehicle should switch from communicating via satellite to communicating via a cellular network at a particular location or within a certain amount of time, based on data 610-650.

During execution, network selector 680 is responsible for controlling the interfaces of the vehicle, so as to initiate a network switchover prompted by the analysis of data 610-650 by machine learning model 670. For example, if machine learning model 670 predicts that a cellular network is the optimum network for the vehicle in one kilometer from the current location of the vehicle, network selector 680 may send instruction(s) 690 to the network interfaces of the vehicle, to initiate the network switchover at the determined time and location. Note that the decisions herein may also be based on a frequency of switchovers, such as, for example, enabling a vehicle to choose to use a 3G connection with high quality and availability rather than a 5G connection with poor quality and spotty coverage (thus requiring more switchovers in areas with a lack of sufficient coverage).

Figure 7:
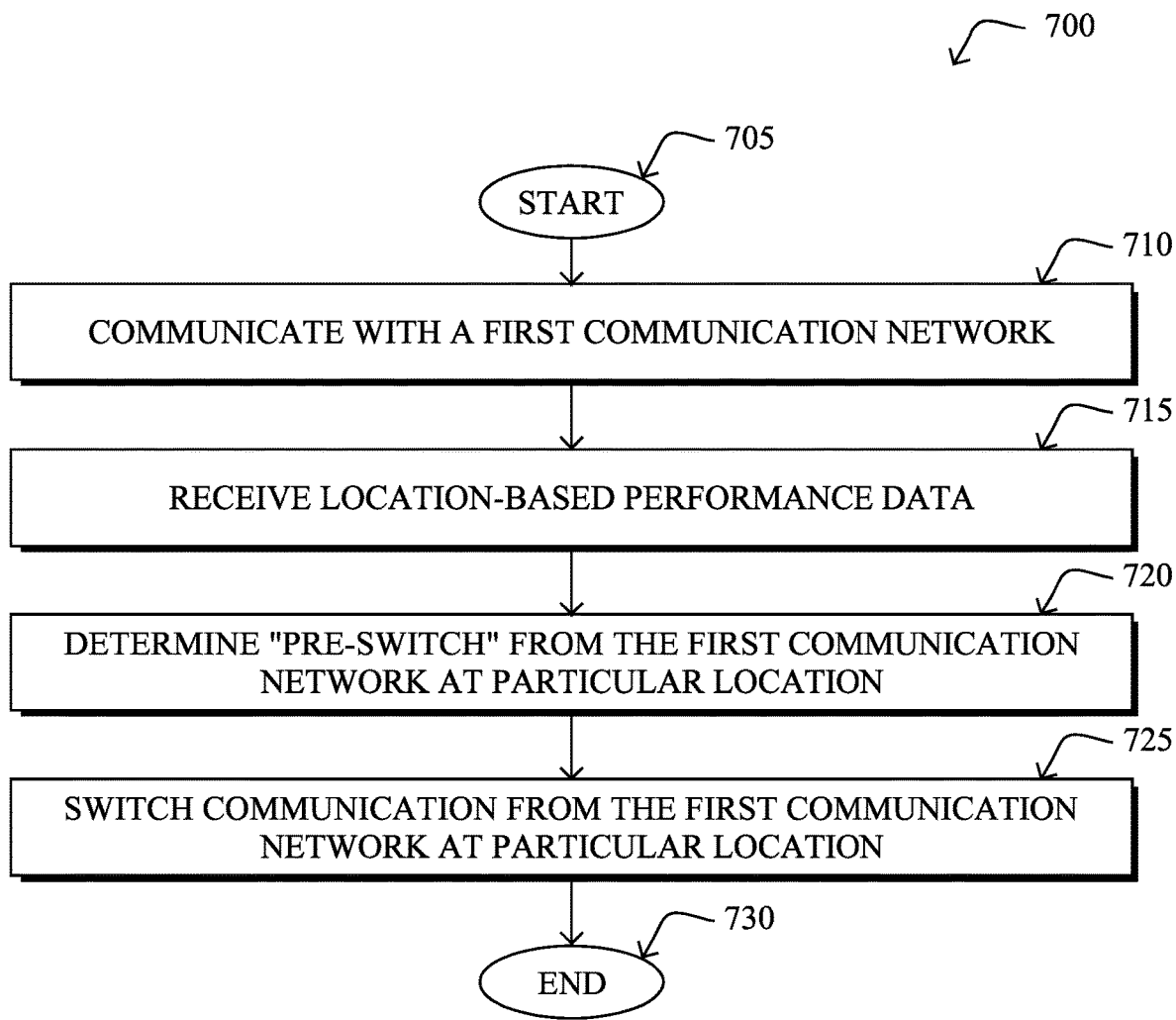
FIG. 7 illustrates an example simplified procedure for switching between communication networks.

FIG. 7 illustrates an example simplified procedure for switching between communication network in accordance with one or more embodiments described herein. For example, a non-generic, specifically configured device (e.g., device 200) may perform procedure 700 by executing stored instructions (e.g., process 248). More specifically, procedure 700 may be performed by a vehicle. The procedure 700 may start at step 705, and continues to step 710, where, as described in greater detail above, the vehicle (e.g., an emergency response vehicle) having a plurality of network interfaces communicates with a first communication network via a first one of the network interfaces. In some embodiments, the first communication network is a cellular network.

At step 715, as detailed above, the vehicle may receive performance data regarding the first communication network and one or more other communication network, wherein the received performance data is associated with a particular location. In some embodiments, the received performance data is indicative of signal quality of the first communication network and of the one or more other communication network at the particular location. The performance data may be received from a supervisory service that utilizes a machine learning model to predict the performance data. The machine learning model may use a "best-fit" model based on the typical navigation (i.e., commute) that a vehicle makes.

In some embodiments, the vehicle receives the performance data at least in part from another vehicle. The performance data received at least in part from another vehicle may include location data, time data, signal quality data, etc. For example, the other vehicle may have previously been at the particular location at a certain time. Therefore, a feedback procedure allows the performance data to reflect the changing nature of communication network over time. For instance, as described above, a vehicle passing an RSU may relay the information (e.g., via DSRC) to that RSU, such that other vehicles passing in the opposite direction can receive that information prior to a critical switch point. Note that through the use of vehicle-to-vehicle communication (e.g., direct or via an RSU), faster information relaying may occur through bypassing any requirement to pass the information through cloud services or other uplink technologies.

At step 720, as detailed above, the vehicle, in advance of arriving at the particular location, may determine that the vehicle should switch from communicating with the first communication network to communicating with a selected one of the one or more other communication network, based on the received performance data (e.g., a "pre-switch" decision). In some embodiments, the selected communication network is a cellular network. In other embodiments, the selected communication network is a satellite network or a Wi-Fi network. The determination may be made that the vehicle should switch to communicating with the selected communication network based further on a measure of criticality associated with an application that the vehicle uses to communicate with the first communication network.

At step 725, as detailed above, the vehicle may switch, at the particular location, from communicating with the first communication network via the first network interface to communicating with the selected communication network via a second one of the plurality of network interfaces. For example, the vehicle may opt to switch from a 5G connection with a first cellular provider (e.g., due to poor quality, spotty coverage, etc.) to a 3G connection from another cellular provider that has a higher quality and availability. In some embodiments, the vehicle provides a notification of the switch to a user interface within the vehicle. The operator of the vehicle may manually override the switch. Procedure 700 then ends at step 730.

It should be noted that while certain steps within procedure 700 may be optional as described above, the steps shown in FIG. 7 is merely an example for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the seamless switch between communication network for a vehicle, thereby improving connectivity for the vehicle and its applications. In particular, the techniques herein determine an optimal location and time to switch to an optimal communication medium, which can be critical for certain applications requiring minimal delay or lost messages. In addition, the gathering and processing of fleet-wide-data enables a vehicle that has not been in a particular geography previously (at that time of day, or day of week) to benefit from the 'experience' that other vehicles have had in the past in that location, at that time of day, on that day of the week. Moreover, the techniques herein provide a feedback mechanism that will 'learn' and 'adapt' as communications network conditions change over time, as connected vehicles can act as sensors to report on their communications environment, and machine-learning algorithms can be applied to the gathered data in order to generate information that enables the vehicles to select the most appropriate communications network for the needs of the applications within the vehicle, as the communications environment changes over time.

While there have been shown and described illustrative embodiments that provide for connected vehicles switching communication network, it is to be understood that various other adaptations and modifications may be made within the spirit and scope of the embodiments herein. For example, while certain embodiments are described herein with respect to using certain models for purposes of switching communication network, the models are not limited as such and may be used for other functions, in other embodiments. In addition, while certain protocols are shown, such as cellular, Wi-Fi, etc., other suitable protocols may be used, accordingly.

According to the embodiments herein, a method herein may specifically comprise: communicating, by a vehicle having a plurality of network interfaces, with a first communication network via a first one of the network interfaces; receiving, at the vehicle, performance data regarding the first communication network and one or more other communication network, wherein the received performance data is associated with a particular location; determining, by the vehicle and in advance of arriving at the particular location, that the vehicle should switch from communicating with the first communication network to communicating with a selected one of the one or more other communication network, based on the received performance data; and switching, by the vehicle and at the particular location, from communicating with the first communication network via the first network interface to communicating with the selected communication network via a second one of the plurality of network interfaces.

In one embodiment, the received performance data is indicative of signal quality of the first communication network and of the one or more other communication networks at the particular location. In one embodiment, the first communication network is a first cellular network and the selected communication network is a second cellular network. In one embodiment, the first communication network is a cellular network and the selected communication network is a satellite network or a Wi-Fi network. In one embodiment, performance data is received from a supervisory service that utilizes a machine learning model to predict the performance data. In one embodiment, the method further comprises providing, by the vehicle, a notification of the switch to a user interface within the vehicle. In one embodiment, the vehicle determines that the vehicle should switch to communicating with the selected communication network based further on a measure of criticality associated with an application that the vehicle uses to communicate with the first communication network. In one embodiment, the vehicle receives the performance data at least in part from another vehicle. In one embodiment, the vehicle is an emergency response vehicle.

According to the embodiments herein, a tangible, non-transitory, computer-readable medium herein may store program instructions that cause a vehicle having a plurality of network interfaces to execute a process specifically comprising: communicating, by the vehicle having a plurality of network interfaces, with a first communication network via a first one of the network interfaces; receiving, at the vehicle, performance data regarding the first communication network and one or more other communication network, wherein the received performance data is associated with a particular location; determining, by the vehicle and in advance of arriving at the particular location, that the vehicle should switch from communicating with the first communication network to communicating with a selected one of the one or more other communication network, based on the received performance data; and switching, by the vehicle and at the particular location, from communicating with the first communication network via the first network interface to communicating with the selected communication network via a second one of the plurality of network interfaces.

Further, according to the embodiments herein an apparatus within a vehicle herein may comprise: a plurality of network interfaces; a processor coupled to the plurality of network interfaces and configured to execute one or more processes; and a memory configured to store a process executable by the processor, the process when executed configured to: communicate with a first communication network via a first one of the network interfaces; receive performance data regarding the first communication network and one or more other communication network available to the vehicle, wherein the received performance data is associated with a particular location; determine, in advance of the vehicle arriving at the particular location, that the apparatus should switch from communicating with the first communication network to communicating with a selected one of the one or more other communication network, based on the received performance data; and switch, at the particular location, from communicating with the first communication network via the first network interface to communicating with the selected communication network via a second one of the plurality of network interfaces.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   communicating, by a vehicle having a plurality of network interfaces, with a first communication network via a first one of the network interfaces;
   receiving, at the vehicle, performance data regarding the first communication network and one or more other communication network, wherein the received performance data is associated with a particular location, and wherein the vehicle receives the performance data at least in part from another vehicle having previously been at the particular location via vehicle-to-vehicle communication;
   determining, by the vehicle and in advance of arriving at the particular location, that the vehicle should switch from communicating with the first communication network to communicating with a selected one of the one or more other communication network, based on the received performance data; and
   switching, by the vehicle and at the particular location, from communicating with the first communication network via the first network interface to communicating with the selected communication network via a second one of the plurality of network interfaces.

2. The method as in claim 1, wherein the received performance data is indicative of signal quality of the first communication network and of the one or more other communication networks at the particular location.

3. The method as in claim 1, wherein the first communication network is a first cellular network and the selected communication network is a second cellular network.

4. The method as in claim 1, wherein the first communication network is a cellular network and the selected communication network is a satellite network or a Wi-Fi network.

5. The method as in claim 1, wherein performance data is received from a supervisory service that utilizes a machine learning model to predict the performance data.

6. The method as in claim 1, further comprising:
   providing, by the vehicle, a notification of the switch to a user interface within the vehicle.

7. The method as in claim 1, wherein the vehicle determines that the vehicle should switch to communicating with the selected communication network based further on a measure of criticality associated with an application that the vehicle uses to communicate with the first communication network.

8. The method as in claim 1, wherein the vehicle is an emergency response vehicle.

9. An apparatus within a vehicle comprising:
   a plurality of network interfaces;
   a processor coupled to the plurality of network interfaces and configured to execute one or more processes; and
   a memory configured to store a process executable by the processor, the process when executed configured to:
      communicate with a first communication network via a first one of the network interfaces;

receive performance data regarding the first communication network and one or more other communication network available to the vehicle, wherein the received performance data is associated with a particular location, and wherein the vehicle receives the performance data at least in part from another vehicle having previously been at the particular location via vehicle-to-vehicle communication;

determine, in advance of the vehicle arriving at the particular location, that the apparatus should switch from communicating with the first communication network to communicating with a selected one of the one or more other communication network, based on the received performance data; and switch, at the particular location, from communicating with the first communication network via the first network interface to communicating with the selected communication network via a second one of the plurality of network interfaces.

10. The apparatus of claim 9, wherein the received performance data is indicative of signal quality of the first communication network and of the one or more other communication networks at the particular location.

11. The apparatus of claim 9, wherein the first communication network is a first cellular network and the selected communication network is a second cellular network.

12. The apparatus of claim 9, wherein the first communication network is a cellular network and the selected communication network is a satellite network or a Wi-Fi network.

13. The apparatus of claim 9, wherein performance data is received from a supervisory service that utilizes a machine learning model to predict the performance data.

14. The apparatus of claim 9, wherein the process when executed is further configured to:

provide a notification of the switch to a user interface within the vehicle.

15. The apparatus of claim 9, wherein the apparatus determines that the apparatus should switch to communicating with the selected communication network based further on a measure of criticality associated with an application that the vehicle uses to communicate with the first communication network.

16. The apparatus of claim 9, wherein the performance data received from the other vehicle is received in real-time.

17. The apparatus of claim 9, wherein the vehicle is an emergency response vehicle.

18. A tangible, non-transitory, computer-readable medium storing program instructions that cause a vehicle having a plurality of network interfaces to execute a process comprising:

communicating, by the vehicle having a plurality of network interfaces, with a first communication network via a first one of the network interfaces;

receiving, at the vehicle, performance data regarding the first communication network and one or more other communication network, wherein the received performance data is associated with a particular location, and wherein the vehicle receives the performance data at least in part from another vehicle having previously been at the particular location via vehicle-to-vehicle communication;

determining, by the vehicle and in advance of arriving at the particular location, that the vehicle should switch from communicating with the first communication network to communicating with a selected one of the one or more other communication network, based on the received performance data; and switching, by the vehicle and at the particular location, from communicating with the first communication network via the first network interface to communicating with the selected communication network via a second one of the plurality of network interfaces.

* * * * *